(12) United States Patent  
Wardell et al.

(10) Patent No.: US 7,314,076 B2
(45) Date of Patent: Jan. 1, 2008

(54) MULTILAYER SHIM PEELING DEVICE

(75) Inventors: Joseph P. Wardell, Cypress, CA (US); Tiencheng Wang, Rolling Hills Estates, CA (US)

(73) Assignee: Northrup Grumman Corporation, Los Angeles, CA (US)

( * ) Notice: Subject to any disclaimer, the term of this patent is extended or adjusted under 35 U.S.C. 154(b) by 471 days.

(21) Appl. No.: 10/947,466

(22) Filed: Sep. 22, 2004

(65) Prior Publication Data

US 2006/0060055 A1    Mar. 23, 2006

(51) Int. Cl.
    *B32B 38/10*    (2006.01)
    *B26D 1/26*    (2006.01)
    *B26D 7/06*    (2006.01)

(52) U.S. Cl. .......................... 156/584; 156/344; 83/34; 83/707; 83/713

(58) Field of Classification Search ................ 156/254, 156/344, 584; 264/148; 83/34, 42, 703–731
    See application file for complete search history.

(56) References Cited

U.S. PATENT DOCUMENTS

| | | | |
|---|---|---|---|
| 19,033 A * | 1/1858 | Law ............................ | 83/705 |
| 19,199 A * | 1/1858 | Morgan ....................... | 83/705 |
| 37,885 A * | 3/1863 | Dougherty ................... | 83/705 |
| 152,318 A * | 6/1874 | Ballard ........................ | 83/703 |
| 5,240,546 A | 8/1993 | Shiga .......................... | 156/378 |
| 5,432,318 A * | 7/1995 | Minahan ..................... | 219/385 |
| 6,415,843 B1 | 7/2002 | De et al. .................... | 584/584 |

\* cited by examiner

*Primary Examiner*—Mark A Osele
(74) *Attorney, Agent, or Firm*—Louis L. Dachs

(57) ABSTRACT

The invention is a device for peeling one or more individual layers of a multilayer shim. In detail the device includes a platform having a surface with a recess. A mechanism is mounted in the recess for mounting the shim and a moving the shim upward such that a portion of the shim is above the surface. A blade assembly is rotatably mounted to the platform, which is rotatable in a plane parallel to the surface. The blade assembly includes a cutting blade mounted thereon, such that said blade is in slidable contact with the surface and movable over the recess. Thus shim can be raised by the mechanism and the portion of the shim requiring removal can be raised above the surface and the blade assembly thereafter can be rotated causing the cutting blade to shear off the portion of the shim above the surface.

7 Claims, 3 Drawing Sheets

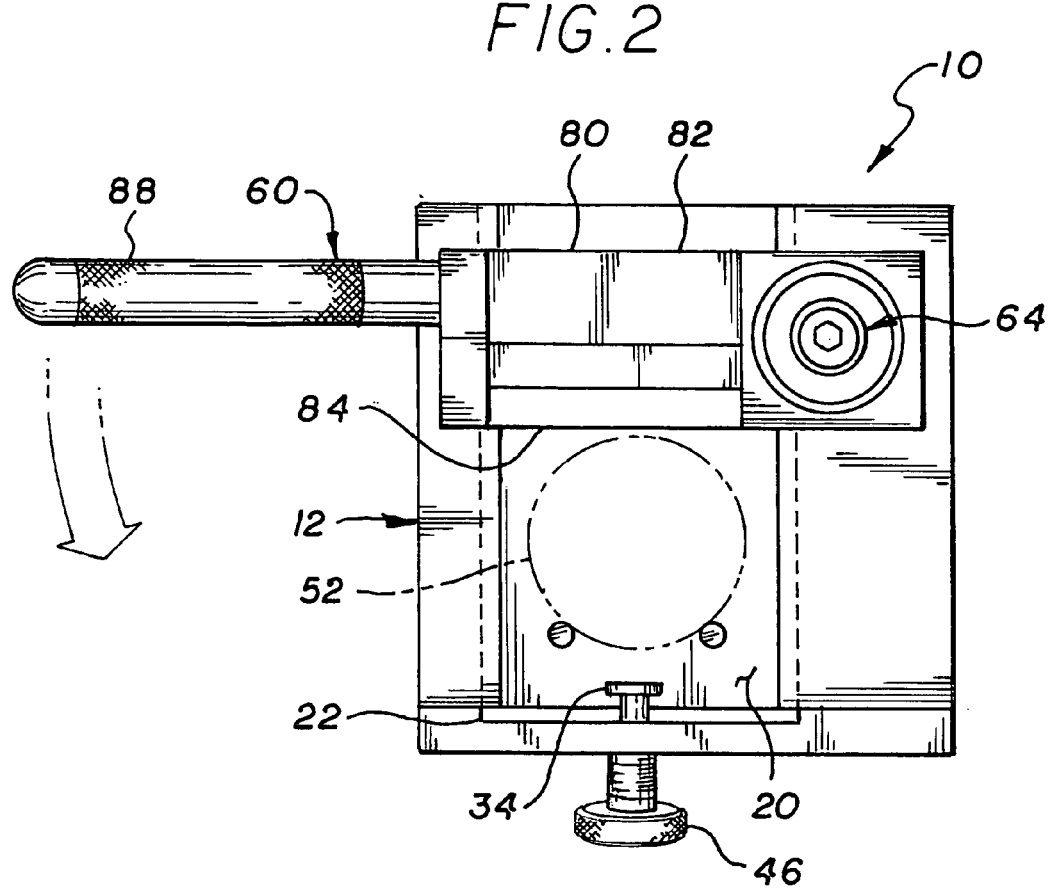
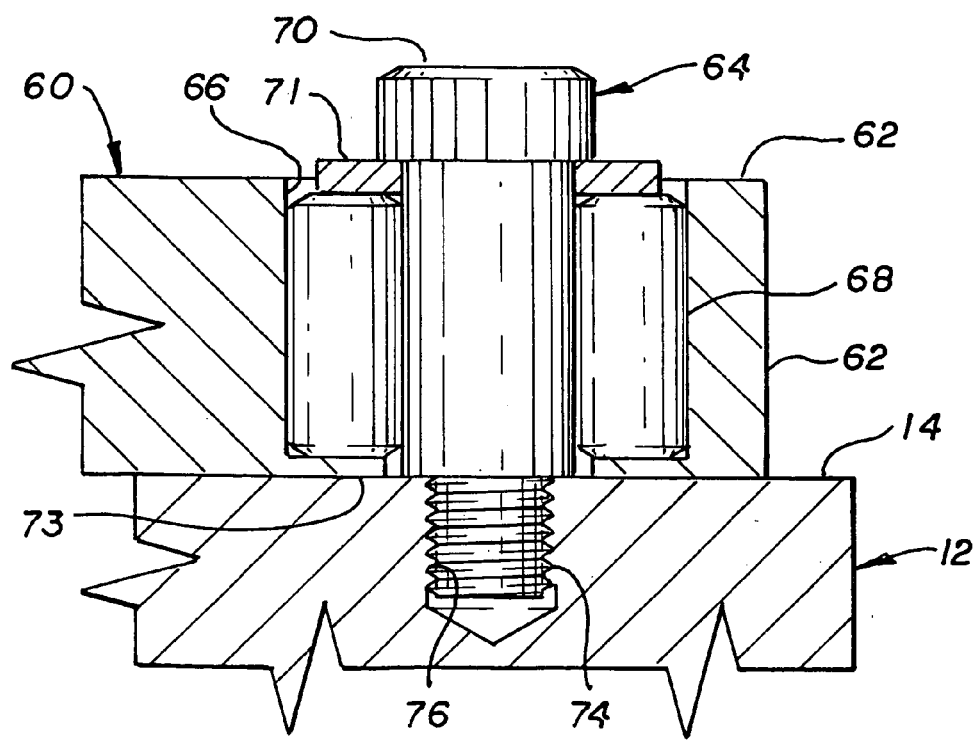

MULTILAYER SHIM PEELING DEVICE

BACKGROUND OF THE INVENTION

1. Field of the Invention

The invention relates to the field of metal removal tools and, in particular, to a device to peel off layers of a laminated multilayer shim.

2. Description of Related Art

Multilayer laminated shims are used in a wide variety of applications to eliminate unwanted movement between joined parts do to tolerance discrepancies. Their primary advantage is that shims of different thickness' need not be shocked. Furthermore, the time consuming task of assembling a multiple number of shims of different thickness is no longer required. One need only measure the gab that needs to be filled, and thereafter peel off the layers of the laminated shim tell the proper thickness is obtained. This was typically accomplished by prying each layer off with a sharp edged knife or the like. However with large shims, the use of a knife without proper support can cause the laminated shim to be bent out of shape. Quite often, too many layers were removed making the shim unusable.

There are devices available for removing thin wafers from surfaces. For example, U.S. Pat. No. 6,415,843 Spatula For Separation Of Thinned Wafer From Mounting Carrier by Bhola De, et al. In this device, a brittle wafer which is mounted on a supporting member is separated there from be means of a spatula like blade that is slidably mounted on a plate. A hand driven screw type drive is used to move the spatula into the wafer separating it from the support member. However, this device provides no means to adjust the height of the wafer in relationship to the spatula. Thus it could not be used to remove variable number of layers from a laminated shim by peeling.

U.S. Pat. No. 5,240,546 Apparatus For Peeling Semiconductor Substrate by Nobuo Shiga discloses an apparatus for peeling a semiconductor substrate from a reinforcing plate. The substrate is pushed in a direction parallel to the bonding surface until it shears away from the reinforcing plate. This device could not be used with a multilayer shim because the individual layers are so thin that they would bundle up and rip apart leaving portions still laminated in place. In addition, there is no means to vary the number of layers of shim to be removed.

Thus, it is a primary object of the invention to provide to provide a device to remove a precise number of layers from a laminated shim.

It is another primary object of the invention to provide a device to remove a precise number of layers from a laminated shim, wherein the number of layers to be removed can be adjusted.

It is a further object of the invention to provide a device to remove a precise number of layers from a laminated shim, wherein the number of layers to be removed can be adjusted, while providing support for the remaining layers of the shim.

SUMMARY OF THE INVENTION

The invention is a device for peeling one or more individual layers of a multilayer shim. In detail, the device includes a platform that includes a surface with a recess. A mechanism is movably mounted in the recess for mounting the shim and moving it upward such that a portion of the shim is above the surface. The mechanism preferably comprise a first block mounted in the recess having a tapered upper surface. A second block includes a tapered lower surface in contact with the tapered surface of the first block. The upper surface of the second block is in a plane parallel to the surface of the platform. A second mechanism positions the shim on the upper surface of the second block. This second mechanism can be simply a spaced apart pair of posts mounted on the upper surface of the second block. Alternately, the second mechanism can further include a third block having a spaced apart pair of holes adapted to receive the posts and further incorporating a surface conforming to a portion of the periphery of the shim. Thus the third block can be mounted on the upper surface of the second block with the posts engaging the holes and the shim can be positioned on the upper surface of the second block.

A third mechanism is provided for moving the second block toward the first block such that the second block is risible. This preferably consists of the second block having a T shaped slot. A fastener having a first end in the form a knob and a second end in the form of a disc shaped member in engagement with the T shaped slot, and a thread portion there between in engagement with the threaded hole in the platform.

A blade assembly is rotatably mounted to the platform and is rotatable in a plane parallel to the surface of the platform and over the recess. The blade assembly includes a cutting blade mounted thereon such that the blade is in slidable contact with the surface of the platform and movable over the recess when the blade assembly in rotated.

Thus the shim can be mounted on the upper surface of the second block, positioned by the first mechanism. The portion of the shim requiring removal can be raised above the surface of the platform by turning of the knob. Thereafter, the arm assembly can be rotated causing at least a portion of shim requiring removal to be peeled off the shim. The remainder can be removed by hand.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a top view of the device shown in FIG. 1

FIG. 4 is a cross-sectional view of FIG. 1 taken along the line 4-4.

DESCRIPTION OF THE PREFERRED EMBODIMENT

Figure 5:
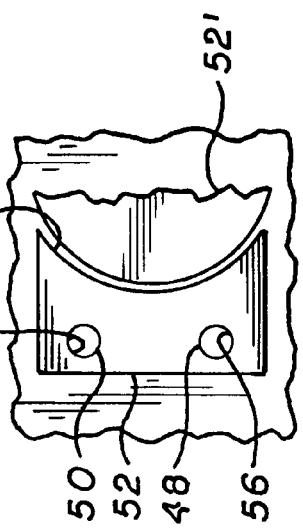
FIG. 5 is a partial top view of FIG. 1 illustrating a second method of positioning shims.

Referring to FIGS. 1-4, the device, generally indicated by numeral 10, includes a platform assembly 12, having a flat upper surface 14 with a square recess 16, with the recess having a flat bottom surface 18. A wedge assembly 20 is mounted in the recess providing a gap 22. The wedge assembly 20 comprises a upper and lower tapered blocks 24 and 26 with mating tapered surfaces 28 and 30 in slidable contact with each other and with the top surface 30 of block 24 and bottom surface 32 of block 26 parallel to each other. The taper angle 33 is approximately 10 degrees. The bottom block 26 is fixed to the bottom surface 18 of the recess 16 by either bonding or fasteners (not shown). Of course, the bottom block could be integral with the platform assembly 16. The upper block 24 includes a T shaped notch 34 at end 36. A bolt 37 having a T shaped end 38 in engagement with the T shaped notch 34 and a threaded mid portion 40 that threadably engages a threaded hole 42 in the wall 44 and terminates in a knob 46. Thus rotation of the knob 46 causes the bolt to advance or retract moving the block 24 forwards or backwards (and up or down); however the top surface 30 remains parallel with flat upper surface 14 of the platform assembly 12. The 10 degree angle provides ability to accurately adjust position of upper block 24 using the screw drive Two posts 48 and 50 protrude from the top surface 30 of the block 24 and are used to position of laminated shim 52. Referring to FIG. 5, an alternate approach is to use a block 52 having two mating holes 54 and 56 that mate with posts 48 and 50 an which includes a curved portion 58 for positioning a laminated shim 52'. Thus different blocks for different size shims would be used.

Again referring back to FIGS. 1-4, an arm assembly 60 is rotatably mounted by its first end 62 to the platform assembly 12, by means of a bolt assembly 64. In detail, the end 62 includes a through hole 66 incorporating a bearing 68. The bolt assembly 64 includes a head portion 70 with a washer 71 there under and a body portion 72 having shoulder 73, in contact with surface 14 of the assembly 12 and a reduced diameter threaded end 74 engaging a threaded hole 76 in the platform assembly 12. The arm assembly 60 includes a center portion 80 to which is mounted a cutter mount 82 having a carbide cutter 84 secured thereto by bonding, brazing or by fastener assemblies (not shown). The arm assembly includes a second end in the form of a handle 88. The arm assembly is dimensioned so that the cutter 84 slides over the upper surface 24 of the platform assembly 12.

Figure 1:
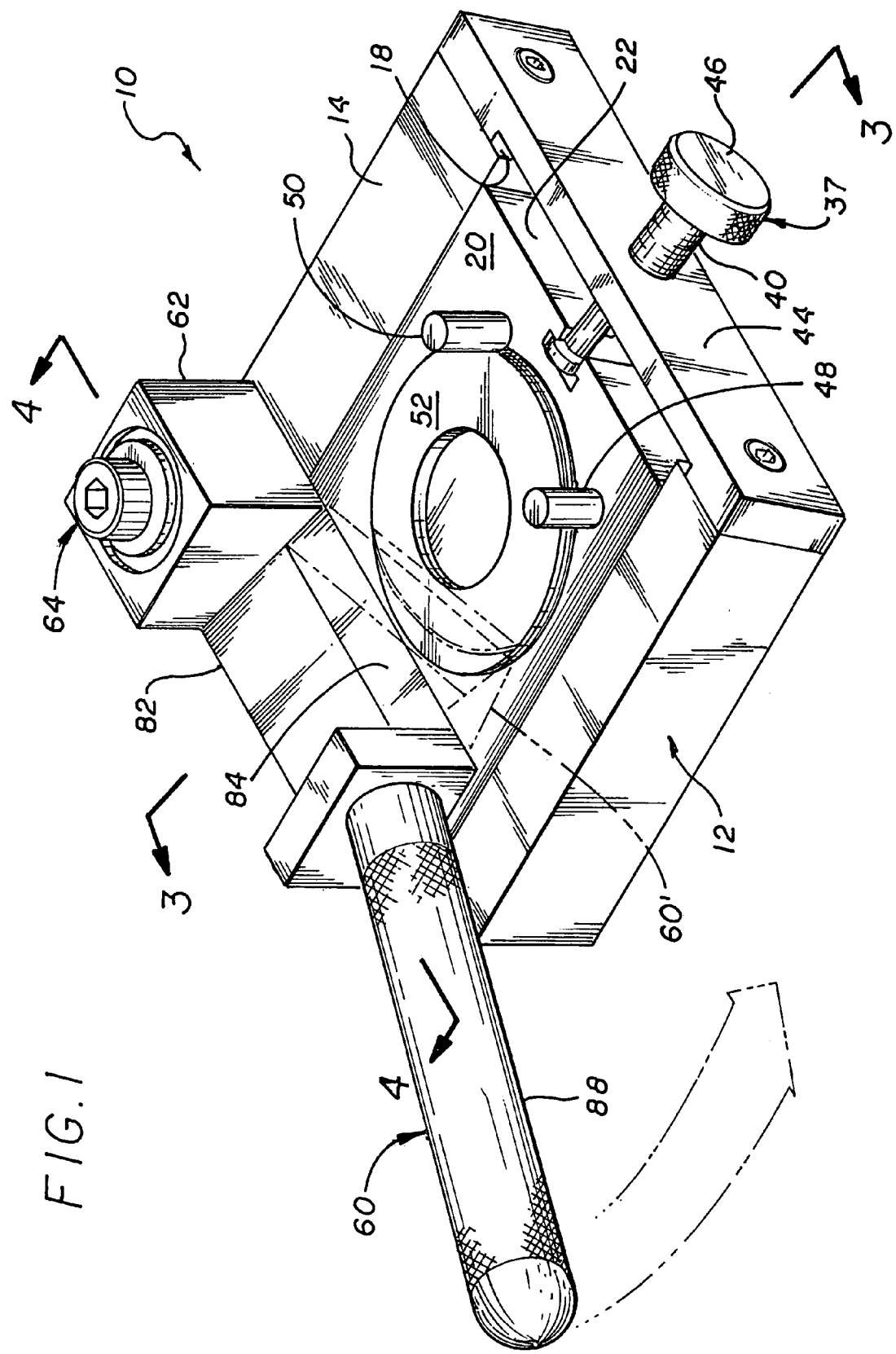
FIG. 1 is a perspective view of the device.
Figure 3:
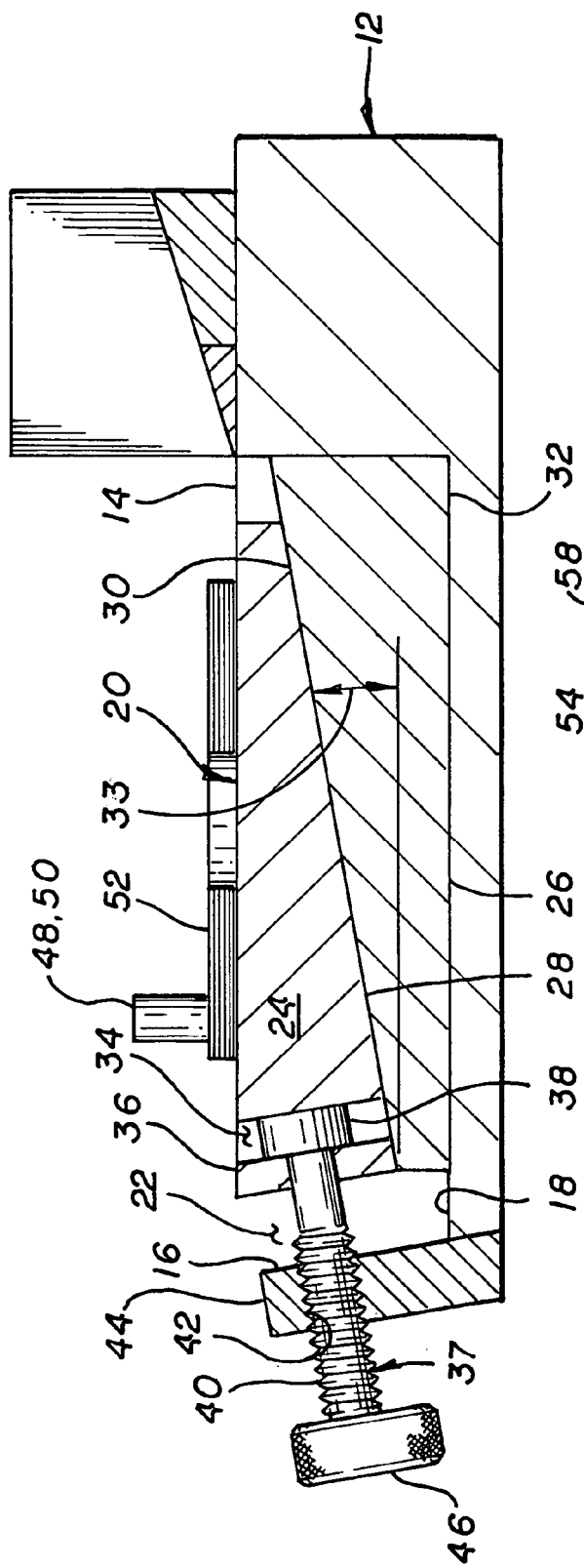
FIG. 3 is a is a cross-sectional view of the device taken along the line 2-2

Referring to FIG. 1, in operation, the laminated shim 52 is placed on the surface 30 of the block 24 such that it rest against the posts 48 and 50. The height of the top surface 30 is adjusted so that at least a portion of the shim 52 is above the surface 24. Thereafter, the arm assembly 60 is rotated and the cutter 84 will cause the layers of above the surface 24 to be peeled off The cutter position is indicated in phantom lines and numeral 84' and the partially peeled shim is indicated by numeral 52'. After about half the surface of the shim is peeled off, the remainder can be pulled off by hand. The typical thickness of each layer of a laminated shim is 0.001 to 0.002 inch thick. Thus having a threaded bolt 36, allows precise height adjustment of the shim.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to tool and die industry.
The invention claimed is:

1. A device for peeling one or more individual layers of a multilayer shim, the device comprising:
 a platform comprising;
  a surface having a recess;
  means movably mounted in said recess for moving the shim upward such that a portion of the shim is above the surface, said means comprising
   a first block mounted in said recess having a tapered upper surface;
   a second block having a tapered lower surface in contact with said tapered surface of said first block, said second block having an upper surface;
   second means for positioning the shim on said upper surface of said second block;
   third means to move said second block toward said first block such that said second block is risible; and
 a blade assembly rotatably mounted to said platform, said blade assembly rotatable in a plane parallel to said surface and over said recess, said blade assembly including a cutting blade mounted on said blade assembly such that said blade is in slidable contact with said surface and movable over said recess when said blade assembly in rotated;
 such that said shim can be said first means and a portion of the shim requiring removal can be raised above said surface and said blade assembly thereafter can be rotated causing said blade to shear off the portion of the shim above the surface.

2. The device as set forth in claim 1 wherein said blade cutting assembly includes a handle.

3. The device as set forth in claim 2 wherein said blade assembly includes a pivot point off set from said recess such that said blade is rotated across the aperture.

4. The device as set forth in claim 3 wherein said blade is removably mounted to said blade assembly.

5. The device as set forth in claim 4 where in said second means comprises a spaced apart pair of posts mounted on said upper surface of said second block.

6. The device as set forth in claim 4 wherein said second means comprises:
 a spaced apart pair of posts mounted on said upper surface of said second block; and
 a third block having a spaced apart pair of holes adapted to receive said posts, said third block having a surface conforming to a portion of the periphery of the shim;
 such that said third block can be mounted on the upper surface of said second block with said posts engaging said holes and the shim can be positioned on said upper surface of said second block.

7. The device as set forth in claim 6 wherein said third means comprises;
 said second block having a T shaped slot;
 said platform having a threaded hole;
 a fastener having a first end in the form a knob and a second end in the form of a disc shaped member in engagement with said T shaped slot, and a thread portion there between in engagement with said threaded hole.

* * * * *